Nov. 17, 1959    B. J. VELKOFF    2,912,871
SPEED CONTROL AND REVERSING DRIVE FOR DRILL PRESS
Filed Aug. 4, 1955    2 Sheets-Sheet 1
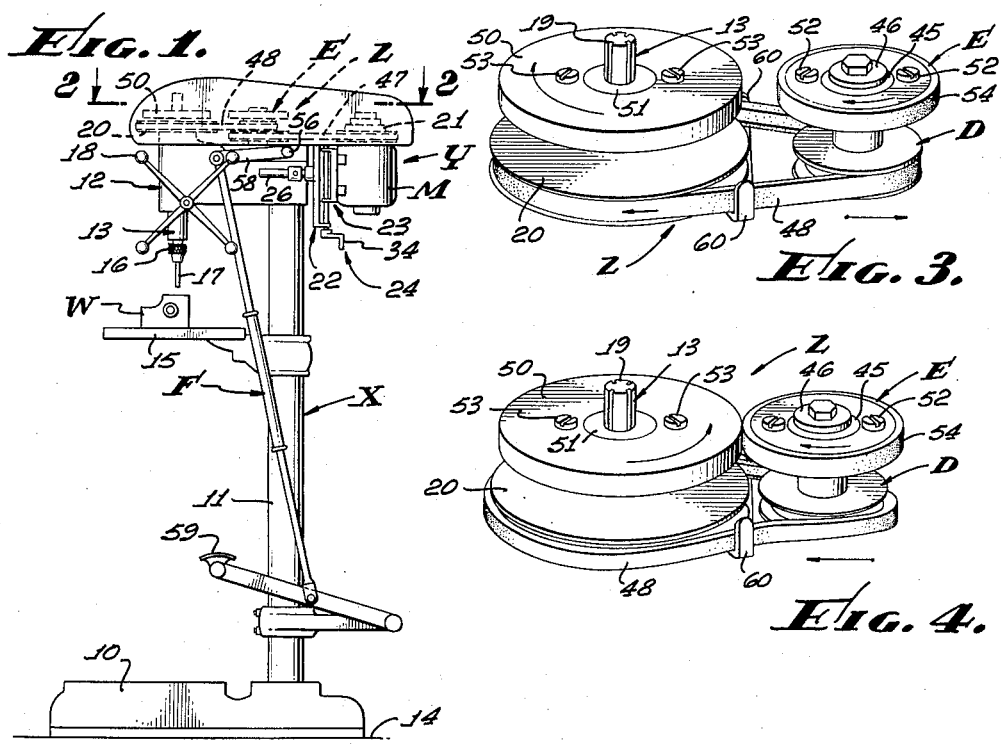
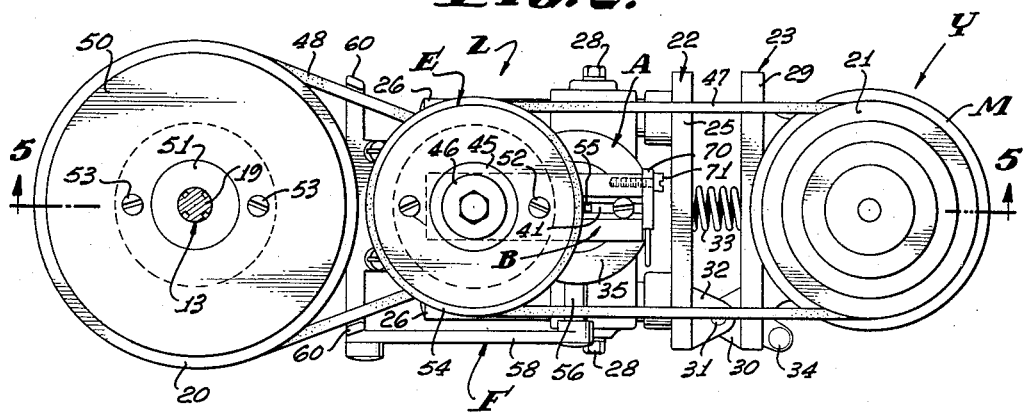
INVENTOR.
BENJAMIN J. VELKOFF
BY
*Maxwell & Maxwell*
AGENTS.

Nov. 17, 1959 B. J. VELKOFF 2,912,871
SPEED CONTROL AND REVERSING DRIVE FOR DRILL PRESS
Filed Aug. 4, 1955 2 Sheets-Sheet 2
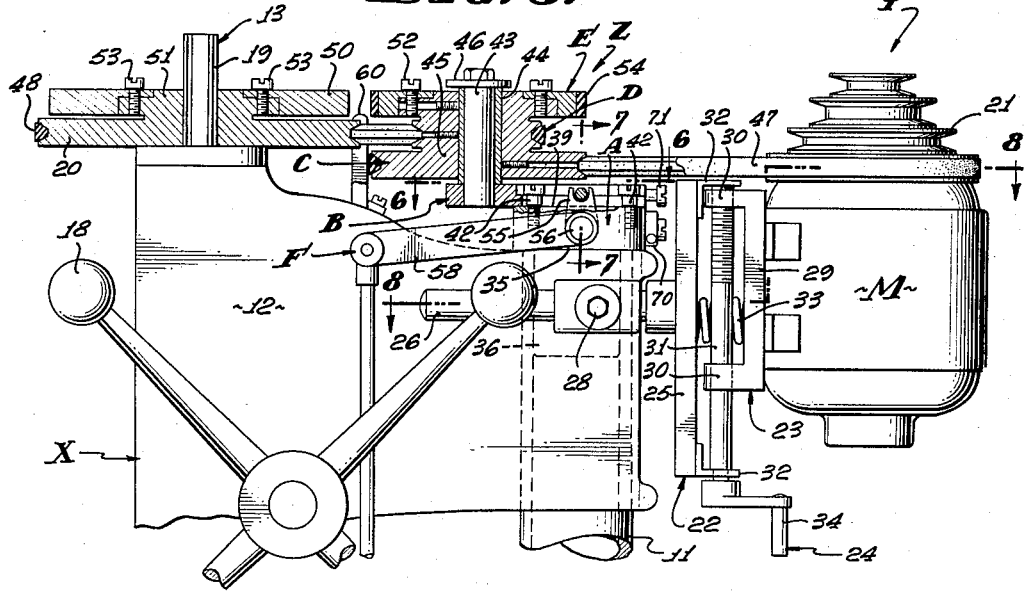
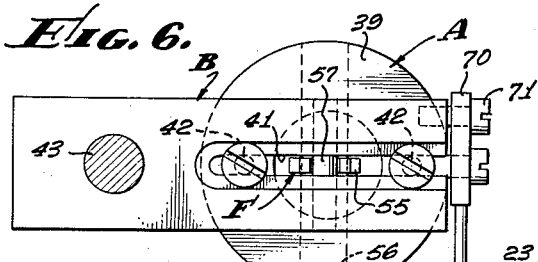
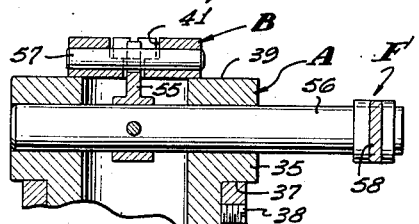
INVENTOR.
BENJAMIN J. VELKOFF
BY
Maxwell & Maxwell
AGENTS.

2,912,871
SPEED CONTROL AND REVERSING DRIVE FOR DRILL PRESS

Benjamin J. Velkoff, Los Angeles, Calif.

Application August 4, 1955, Serial No. 526,428

2 Claims. (Cl. 74—203)

This invention relates to a speed control and reversing drive for machine tools and is particularly concerned with a mechanism for driving and reversing the direction of rotation of a drill press spindle while the motor or drive of the machine tool continuously operates, it being a general object to provide a simple and reasonably inexpensive structure in the form of an attachment that is easily applied to a drill press, or the like, and which operates in an efficient foolproof manner.

In the form of the invention illustrated in the drawings, and hereinafter described, the invention is applied to a simple light duty belt driven drill press, it being understood that the drive of the present invention may be applied to other heavier and similar types of machine tools, such for example, as lathes, etc.

In the operation of a drill press, it is often necessary or desired to reverse the tool or cutter handled by the spindle thereof. For example, in the process of tapping a hole the rotation of the tap must be reversed and the tap backed out of the hole. Ordinarily, a rather expensive tapping head must be employed to carry out such a process. However, with the drive that I have provided, a simple ordinary inexpensive tap may be employed and the spindle of the machine tool reversed without stopping the motor drive of the tool.

It is an object of this invention to provide a structure to be incorporated in a machine tool such as a drill press to drive the spindle thereof in a forward or reverse direction without stopping or slowing the drive motor of the machine tool.

It is also an object of this invention to provide a structure of the character above referred to that is adjustable to vary the speed of the spindle of the machine tool.

It is still another object of this invention to provide a belt driven drive of the character referred to that releases the spindle so that it can be rotated in a reverse direction of rotation.

It is still another object of this invention to provide a shiftable motor mount that is adjustable to varying heights in order to accommodate the drive belt in any one of a plurality of pulleys driven by the motor.

An object of this invention is to provide a control for effecting the reversing action above referred to and which allows the spindle of the machine tool to be driven in a forward direction or a reverse direction or which may allow the spindle to be held in a neutral position where the spindle is idle.

The various objects and features of my invention will be fully understood from the following detailed description of a typical preferred form and application of my invention, throughout which description reference is made to the accompanying drawings, in which:

Fig. 1 is a side elevation of a typical machine tool to which the structure of the present invention may be applied. Fig. 2 is an enlarged detailed plan view of the machine taken as indicated by line 2—2 on Fig. 1. Figs. 3 and 4 are perspective views of a portion of the structure that I have provided, Fig. 3 showing the drive in a position to rotate the spindle of the machine in a forward direction of rotation, and Fig. 4 showing the drive in a position to rotate the spindle of the machine in a reverse direction of rotation. Fig. 5 is a view taken substantially as indicated by line 5—5 on Fig. 2 and showing parts of the structure in section. Fig. 6 is an enlarged detailed view of a portion of the structure taken as indicated by line 6—6 on Fig. 5. Fig. 7 is an enlarged detailed sectional view of a portion of the structure taken as indicated by line 7—7 on Fig. 5, and Fig. 8 is a sectional view taken substantially as indicated by line 8—8 on Fig. 5.

The drive of the present invention is shown applied to a machine tool or drill press X that is characterized by a base 10, a standard 11, a head 12, and a spindle 13. The base 10 is a horizontally disposed part adapted to be carried on a suitable support 14 such as a floor and the standard 11 projects vertically and upwardly from the base 10 to carry the head 12 at a point spaced above the base. The head 12 is a horizontally disposed part and projects laterally of the standard 11 and rotatably carries the spindle 13 on an axis parallel to and spaced from the vertical axis of the standard 11. A table 15 is also carried by the standard 11 to be shiftable vertically thereof and is adapted to carry a piece of work W to be machined. A chuck 16 is carried and driven by the lower exposed end of the spindle 13 to handle a tap 17 or like cutting tool. The spindle 13 in accordance with drill press construction is slidably carried in the head 12 and is vertically shiftable therein under control of a manually operable means 18. As shown, the upper end portion 19 of the spindle 13 projects from the top of the head 12 and is splined to have sliding and driving engagement with a pulley 20. The machine tool thus far described may be any ordinary drill press construction and may vary without affecting the structure of the present invention.

As shown, the drive of the present invention involves, generally, a motor unit Y and a reversing unit Z. The motor unit Y is carried by the head 12 at the rear side of the drill press X and at the side opposite the spindle 13, while the reversing unit Z is carried intermediate the unit Y and the spindle 13 and is preferably carried by the standard 11 which is exposed at the upper side of the head 12. As illustrated, the drive is a belt and a pulley drive that operates to rotate the spindle 13 of the drill press X in both a forward and a reverse direction. Because the cutting is performed on the work W when the spindle 13 turns in a forward direction, the arrangement of pulleys is such as to effect a substantial speed reduction between the unit Y and the spindle 13, while the arrangement of pulleys is such as to effect a high speed of rotation when the spindle 13 is reversed. Further, the arrangement or use of pulleys may be varied to effect the desired speed reduction.

The motor unit Y is a driving unit for rotating the spindle 13 and may involve an ordinary electric motor M. A cone pulley 21 having a plurality of individual pulleys of varying diameters is carried by and driven by the motor M. As shown, the motor M is carried on a vertically disposed axis at the rear of the drill press X, and in accordance with the invention, the unit Y further involves an adjustable motor bed 22, a shiftable motor mount 23 and a positioning means 24 for the motor mount 23.

The adjustable motor bed 22 may be of the usual construction employed in machines of the type under consideration and has a flat vertically disposed plate 25 adapted to carry the motor M. The plate 25 is shiftably carried by the head 12 to occur at the rear side thereof and is supported by one or more rods 26 slidably engaged in openings 27 in the head 12. As shown, there is a pair of rods 26, one at each side of the head 12, there being set screws 28 for holding the motor bed 22 in the desired operating position.

The shiftable motor mount 23 that I have provided is supported by the bed 22 above described, and in the preferred form of the invention, is a simple pivotally mounted platform 29 normally carried in a plane parallel with the plane of the plate 25. The platform 29 has spaced upper and lower lugs 30 at one side thereof that are engaged with a vertically disposed pivot pin 31 carried by brackets 32 that project from the plate 25. A spring 33 is engaged between the plate 25 and the platform 29 at a point remote from the pivot pin 31 to yieldingly urge the mount 23 and motor M in a rearward direction.

The positioning means 24 is provided to place the motor M vertically so that any one of the several pulleys of the pulley 21 may be utilized. The means 24 involves the pivot pin 31, which pin may be shouldered at its ends and is rotatably carried by the brackets 32. The upper end portion of the pin 31 is threadedly engaged with the uppermost lug 30 while the lower end portion of the pin 31 is rotatably and slidably carried in an opening through the lowermost lug 30. A crank 34, or the like, is provided to rotate the pin 31 so that the platform 29 and motor M are raised or lowered by action of the threaded engagement between the pin 31 and the upper lug 30. It will be apparent how the platform 29 is free to shift or swing under influence of the spring 33 to keep the drive belt under tension as hereinafter described.

The reversing unit Z is an attachment type of structure that is applied to the drill press X at the head 12 thereof to occur between the spindle 13 and the motor unit Y. In the preferred form of the invention, the unit Z is carried on the upper end of the standard 11 and involves, generally, an adapter A, a carriage B, a drive pulley C, a driven pulley D, a reversing wheel E, and a shifting means F for the carriage B. The adapter A is secured to the head 12 or standard 11, and the carriage B is shiftably supported on the adapter A to move the pulleys C and D for engagement or disengagement with the spindle 13.

The adapter A is shown as a plug-like body of material engaged in the upper end of the standard 11 and involves a table portion 35 and a reduced skirt portion 36. The skirt portion 36 is carried in the bore that extends through the standard 11 while a shoulder 37 on the adapter rests on the upper end of the standard to support the adapter A. Set screws 38 are provided to hold the adapter in proper operating position. As illustrated, the table portion 35 has a flat horizontally disposed top face 39 preferably machined smooth to slidably support the carriage B.

The carriage B is slidably supported on the adapter A and carries the pulleys C and D and reversing wheel E. As shown, the carriage B may be a simple flat elongate shaped piece of material having a flat bottom face adapted to have sliding engagement with the face 39 of the adapter A. A means is provided to guide and secure the carriage B in proper operating position which may involve a guideway 41 and guide pins 42. The guideway 41 is preferably formed in the carriage B and extends longitudinally thereof in a plane that extends between the motor unit Y and spindle 13. The guide pins 42 may be shouldered screw members suitably spaced and threaded into the adapter A with the result that the pulley D and wheel E are free to shift forwardly and rearwardly between the positions shown in Figs. 3 and 4 of the drawings. The carriage B includes a pulley shaft 43 that projects upwardly from the carriage on a vertical axis. As shown, a bearing sleeve 44 is carried by the shaft 43 to rotatably carry a hub 45.

The drive pulley C is preferably carried at the lower end portion of the hub 45 that is coextensive with the shaft 43 and sleeve 44 which hub is held on the shaft by means of a retainer 46. The drive pulley C and motor pulley 21 are preferably V-built type pulleys, the pulley C being of relatively large diameter. A drive belt 47 extends between the pulley C and pulley 21 and it will be readily understood how the belt 47 is maintained under proper tension by means of the spring 33 as the carriage B is shifted to move the pulley C.

The driven pulley D is shown carried at the central portion of the hub 45 to be in alignment with the pulley 20. Both the pulley D and the pulley 20 may be ordinary V-built type pulleys, the pulley 20 being larger than the pulley D to effect a speed reduction, it being understood that pulleys of the desired relative size may be employed as circumstances require. A driven belt 48 extends between the pulleys D and 20, and it will be readily understood how this belt is maintained under proper tension by the spring 33.

With the belt drive thus far described, it will be apparent that the spindle 13 is rotated in the same direction that the motor M rotates. In order to reverse the direction of rotation, I have provided a reversing wheel E and a reverse drum 50 that is carried on a hub 51 that carries the pulley 20. The hub 51 is provided with keyways that slidably engage with the splines on the upper end portion of the spindle 13. As shown, the wheel E and drum 50 are releasably secured to the hubs 45 and 51, respectively, so that sets of wheels and drums of varying relative diameters may be employed and easily and quickly changed. Screw fasteners 52 and 53 may be provided to hold the wheel E and drum 50 in proper operating positions. The wheel E and drum 50 may be gears, or the like, however, in practice, the wheel E and drum 50 frictionally engage with each other when brought together by shifting the carriage B, the drum 50 having a smooth cylindrical periphery, and the wheel E being provided with a tire 54 of rubber or like material.

The shifting means F that I have provided is adapted to move the carriage B forwardly against the pressure of the spring 33 to disengage the driven belt 48 from the pulley D and pulley 20, and to bring the wheel E and drum 50 into driving engagement. It will be apparent that when the wheel E and drum 50 are engaged, the spindle 13 is rotated in a direction opposite to the direction of rotation of the motor M. The means F may be any means for effecting controlled movement of the carriage B and as shown, preferably involves a clevis member 55 carried by a rotatable shaft 56. The member 55 is engaged with a pin 57 carried by the carriage B so that when the member 55 is rotated, the pin is engaged to move the carriage. A lever 58 is provided to rotate the shaft 56 and there is a treadle 59 connected to the lever 58 by means of a link so that the carriage B may be shifted by engaging the treadle 59.

A feature of the invention is the provision of belt guides 60 provided to hold the driven belt 48 disengaged from the pulley E and pulley 20 when the spindle 13 is being reversed. The guides 60 are in the nature of hinges that are positioned to be adjacent the belt during normal driving operation thereof at a point intermediate the two pulleys. When the wheel E and drum 50 are brought into driving engagement with each other, the belt 48 is released from the pulleys D and 20 and the guides 60 provide sealing or enlargement of the belt so that the pulleys move inwardly toward each other and free of the belt 48. By releasing the tension from the belt 48 the pulley will slide on the belt and will cease to have driving engagement therewith.

It is another feature of this invention to provide means for holding the carriage B in a forward reversing position. As shown, I have provided a latch 70 pivotally carried by the adapter A and adapted to be swung over the head of an adjusting screw 71. The screw 71 may be adjusted so that when engaged by the latch 70 the carriage B is held in the proper supported position for reversing the rotation of the spindle 13.

It will be apparent that the wheel E and drum 50 may be employed to drive a cutting tool such as a drill in a forward direction of rotation by simply reversing rotation of the motor M.

From the foregoing, it will be apparent that I have provided an extremely simple and practical structure for reversing rotation of a machine tool such as a drill press or the like and which operates to immediately effect reversal of the spindle without stopping or slowing the motor drive. With the motor unit Y that I have provided, it is a simple matter to alter the speed of rotation by use of the positioning means 24 whereby different sized pulleys may be employed to drive the spindle. Further, when it is desired to reverse the direction of rotation of the spindle, it is a simple matter to shift the carriage B of the reversing unit Z that I have provided whereby the belt drive is disengaged and the wheel drive is engaged to the end that the spindle immediately changes direction of rotation. Further, it is to be observed that the speed of rotation during reversal of the spindle may be greater than the speed of the spindle when driven in a forward direction thereby retracting the cutting tool such as a tap more rapidly than would otherwise be possible.

Having described only a typical preferred form and application of my invention, I do not wish to be limited or restricted to the specific details herein set forth, but wish to reserve to myself any variations or modifications that may appear to those skilled in the art and fall within the scope of the following claims.

Having described my invention, I claim:

1. A reversing drive for the spindle of a machine tool of the character described having a head rotatably carrying the spindle and a motor unit shiftably carried at the head and having a plurality of pulleys of different diameter and adjusting means for positioning the pulleys for varying the speed thereof, including, a hub on the spindle, a pulley and a drum carried on the hub to drive the spindle, a reversing drive between the motor unit and spindle and including, a drive between the motor unit and said reversing drive, a pulley at said reversing drive and a belt extending between said pulley and the first mentioned pulley, a wheel at said reversing drive and engageable with said drum and a laterally shiftable carriage having a shaft rotatably supporting said second pulley and wheel and shiftable to release the belt and engage the wheel and the drum.

2. A reversing drive for the spindle of a machine tool of the character described having a head rotatably carrying the spindle and a motor unit shiftably carried at the head, including, a hub on the spindle, a pulley and a drum carried on the hub to drive the spindle, a motor carrying platform carried by a pivot pin and a spring yieldingly urging the platform away from the spindle, the pivot pin being threadedly engaged with the head and rotatable to adjustably position said platform and motor unit, a reversing drive between the motor unit and spindle and including, a drive between the motor unit and said reversing drive, a pulley at said reversing drive and a belt extending between said pulley and the first mentioned pulley, a wheel at said reversing drive and engageable with said drum, and a laterally shiftable carriage having a shaft rotatably supporting said second pulley and wheel and shiftable to release the belt and engage the wheel and the drum.

References Cited in the file of this patent

UNITED STATES PATENTS

| | | |
|---|---|---|
| 644,341 | Tichhorne | Feb. 27, 1900 |
| 948,825 | Pletz | Feb. 8, 1910 |
| 1,311,912 | Peterson | Aug. 5, 1919 |
| 1,417,699 | Sumbling | May 30, 1922 |
| 1,520,625 | Wigley | Dec. 23, 1924 |
| 2,054,692 | Charron | Sept. 15, 1936 |
| 2,073,704 | Mitchell | Mar. 16, 1937 |
| 2,176,572 | Hedgpeth | Oct. 17, 1939 |
| 2,224,309 | Mack | Dec. 10, 1940 |
| 2,360,181 | Waltz | Oct. 10, 1944 |
| 2,664,756 | Fismer | Jan. 5, 1954 |
| 2,670,630 | Williams | Mar. 2, 1954 |
| 2,693,710 | Huelsdonk | Nov. 9, 1954 |
| 2,722,841 | Becker | Nov. 8, 1955 |
| 2,780,107 | Sorrell | Feb. 5, 1957 |